Patented June 7, 1932

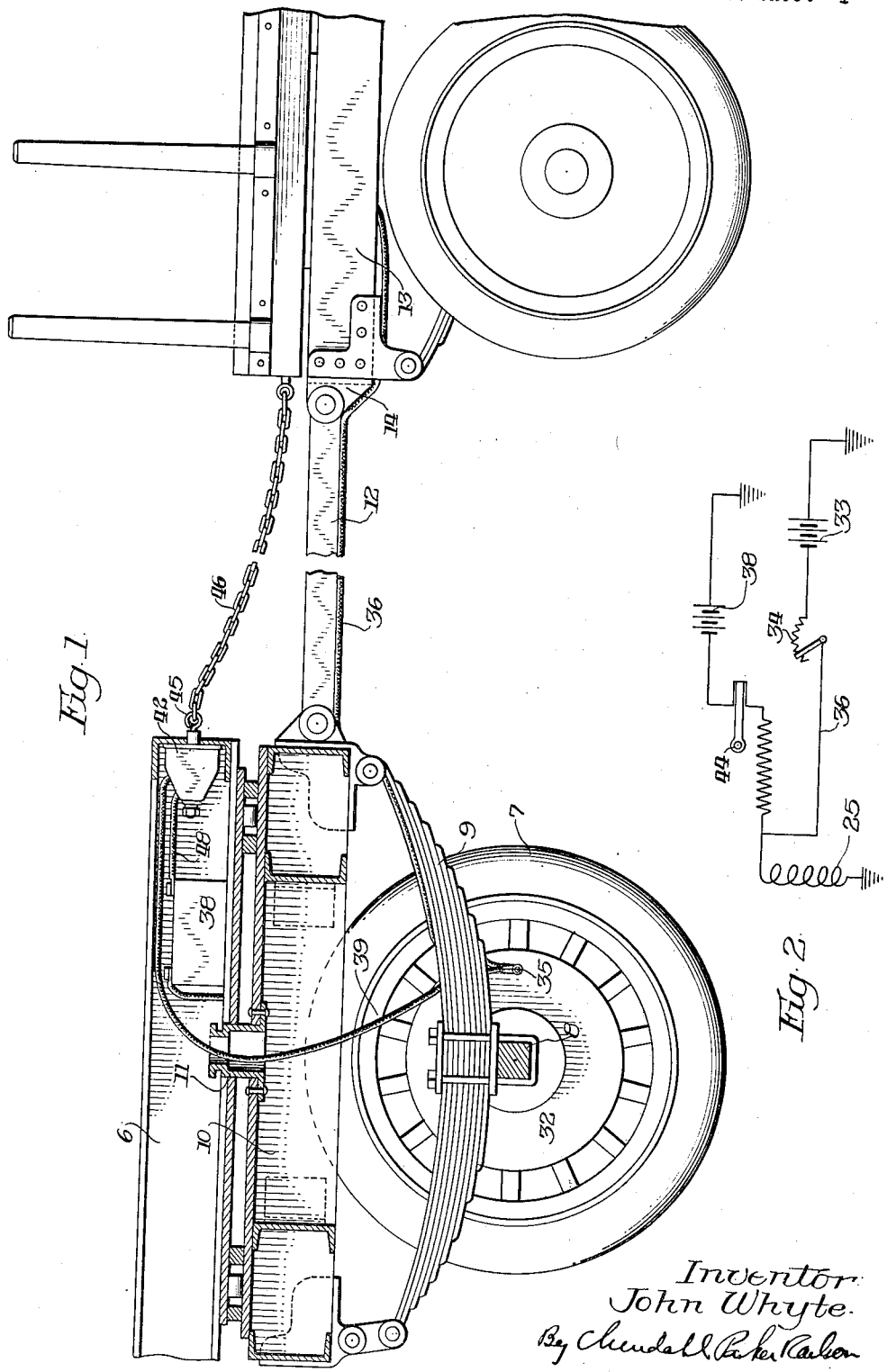

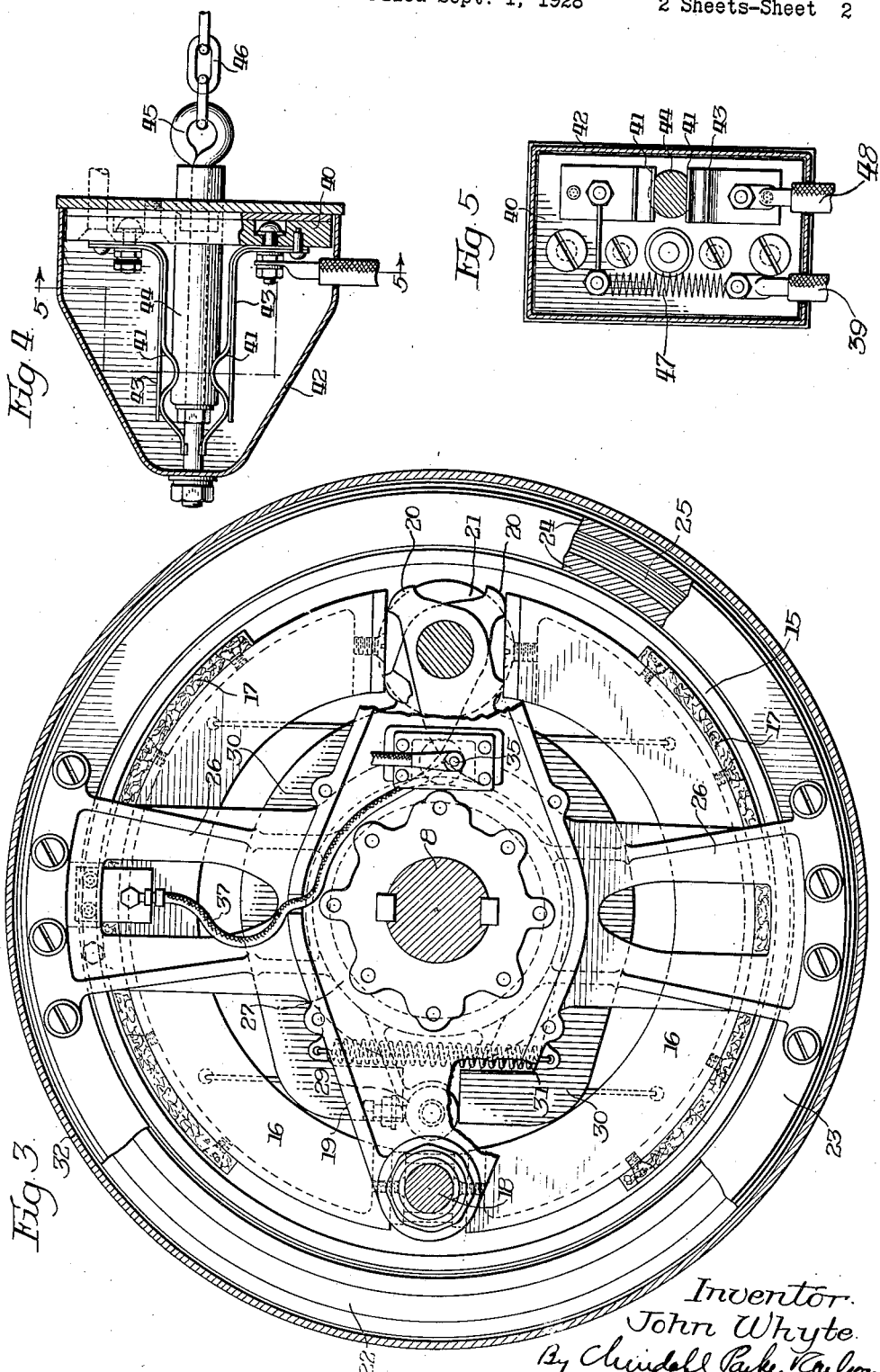

1,861,770

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

TRAILER BRAKE CONTROL

Application filed September 1, 1928. Serial No. 303,409.

This invention relates to the control of trailer brakes and more particularly to the control of an electric brake on a tractor-trailer vehicle.

The object of the invention is to provide a novel means for automatically applying an electromagnetically controlled brake on a trailer vehicle upon accidental disconnection of the trailer from its tractor.

Other objects and advantages of the invention will become apparent from the following detailed description taken in connection with the accompanying drawings, which Figure 1 is a fragmentary side view of a tractor-trailer combination equipped with a brake control mechanism embodying the features of the present invention, the trailer being shown in central vertical section.

Fig. 2 is a wiring diagram of the brake control mechanism.

Fig. 3 is a sectional view of the electric brake used on the trailer.

Fig. 4 is a sectional view of a switch by which the electric brake is controlled.

Fig. 5 is a section taken along the line 5—5 of Fig. 4.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In its exemplary form shown in the drawings the invention is embodied in a trailer of the four-wheel type comprising a frame 6, supported at its front and rear ends by pairs of wheels 7 through the medium of axles 8, springs 9, and turntables 10. The front turntable is swiveled to the frame 6 in any preferred manner, such as by a king bolt 11. A tongue 12 is pivotally connected to the forward end of the turntable and is adapted to have its forward end detachably connected to the rear end of the tractor frame by any preferred form of coupling device 14.

The brakes for the trailer are preferably applied to the front wheel 7 and, in the form illustrated, are of the momentum type arranged to be controlled electromagnetically. The details of the brake construction thus described and the operator therefor, are disclosed and claimed in my copending application, Serial No. 262,122, filed March 16, 1928. The particular construction forms no part of the present invention and is disclosed herein merely as an exemplary form of electrically controlled momentum brake with which the present invention is intended to be used. Each brake unit comprises generally a friction brake of the internal expanding type and an electromagnetically controlled operator therefor adapted when energized to derive an actuating force from the momentum of the moving trailer and to apply this force with increased mechanical advantage to the friction brake proper.

Referring now to Fig. 3, each of the friction brakes comprises a drum 15 secured to the inner side of the wheel 7 concentric with the axle 8 and a pair of rigid segmental shoes 16 arranged in end to end relation within the drum and having friction coverings 17. The shoes are held against rotation either by a stud 18 on an arm of a spider 19 keyed to the axle 8 or by a pair of expanding cams 20 mounted in coaxial relation on a stud 21 between the adjacent ends of the shoes. Thus the shoes may be expanded by oscillation of either of the cams 20 away from their normal brake released position.

The momentum operator comprises two cooperating friction elements, one rotatable with the drum 15, the other being mounted for oscillatory movement and adapted to be brought into frictional gripping engagement with the rotatable element by the energization of a magnetic winding carried by one of the elements. In the present instance the rotatable element is in the form of a ring 22 of magnetic material secured externally of and against rotation relative to the drum 15 and presenting an inwardly facing friction surface.

The other element constitutes an electromagnet and comprises a ring 23 of U-shaped cross section having two poles 24 between which is mounted an annular winding 25. The ring is mounted for oscillatory movement about the drum axis with its pole faces disposed opposite the armature ring 22. To this end the ring 23 is rigidly secured to the ends of a pair of arms 26 of a bell crank having a hub 27 journaled on the hub of the spider 19. It will thus be apparent that when the rings 22 and 23 are brought into gripping engagement by energization of the winding 25 the magnet and the bell crank arms 26 will be oscillated away from their normal brake released position shown in Fig. 3 in the direction of the rotation of the arm.

To apply the force thus derived from the momentum of the moving trailer to the friction brake the bell crank is provided with a short arm 28 carrying a lateral extending roller stud 29 positioned between the ends of two crank arms 30 disposed on opposite sides of the axle 8 and formed integral with the respective expanding cams 20. The crank arms are normally held against the hub of the spider 19 by a contractile spring 31 which operates to restore the magnet and the parts of the force augmenting connection to brake released position upon the energization of the magnet following the application of the brakes. The crank arms 30 are actuated selectively depending on the direction of oscillation of the driven friction element when the winding 25 is energized.

A self contained electric brake unit is thus provided for each front wheel of the trailer, each unit being completely enclosed by a casing 32 (Fig. 1) for excluding dust and dirt from the operating parts of the brake.

The circuit by which the windings of the trailer brakes may be energized at the wheel of the tractor driver includes the usual storage battery 33 (Fig. 2), one terminal of which is grounded to the tractor frame, the other being connected to a rheostat 34 arranged to be actuated either by foot or by hand. The other rheostat terminal is connected to a binding post 35 (Figs. 1 and 3) on each trailer brake through the medium of a conductor which may take the form of a flexible insulated cable 36 extending between the tractor and trailer. The binding post is connected by a wire 37 (Fig. 3) within the casing 32 to one end of the magnet winding 25, the other end being grounded to the trailer frame. It will thus be apparent that upon operation of the rheostat when the tractor and trailer are in motion the windings of the electric brakes will be energized and the brakes set to arrest the motion of the trailer.

The auxiliary brake control circuit by which the trailer brakes are applied automatically under emergency conditions includes a battery 38 preferably comprising a series of dry cells carried by the trailer frame. One terminal of the battery is grounded to the trailer frame. The other leads to the trailer brakes through an insulated connection including a cable 39 and a switch which is normally held open and which is automatically closed in case the draft connection between the tractor and trailer is accidentally broken.

The automatic switch is shown in detail in Figs. 4 and 5 and comprises an insulating base 40 supporting a pair of contact members 41 within a casing 42, the switch unit being preferably mounted in an out of the way position on the forward end of the trailer. The contact arms are normally urged together by leaf springs 43 but are held out of electrical contact by the insulated head of a plug 44 inserted through the base 40 between the arms 41, the curved portions of the latter engaging an annular depression in the plug so as to yieldably hold the plug in the position shown in Fig. 4.

The plug may be inserted in the casing 42 through a forwardly facing opening in the foremost cross-piece of the trailer frame on the rear side of which the casing is preferably mounted. The forwardly projecting end of the plug has an eye 45 connected to the tractor by a flexible member such as a light chain 46, there being sufficient slack in the chain as to allow the plug to remain in position between the switch contact arms while the tractor and trailer are operating under normal conditions.

As shown in Fig. 5 one contact member 41 is connected to a resistance element 47 which, in turn, is connected by the conductor 39 to the binding post 35 of each trailer brake. The other contact member is connected by a cable 48 to one terminal of the battery 38, the other terminal being grounded. Thus an auxiliary energizing circuit is formed in parallel with the main brake control circuit above described.

This auxiliary circuit is intended to be rendered operative only when the trailer is disconnected from the tractor as, for example, when the coupling mechanism due to road vibration or other causes happens to become disengaged. When such a condition arises the tractor and trailer separate, which places the chain 46 under tension thereby causing the plug 44 to be pulled out of the switch housing. This allows the contact members 41 to engage each other, thereby closing the auxiliary circuit to the trailer brake windings which sets the brakes and brings the trailer to a stop. When the two vehicles are again connected by the draft bar 36 for combined operation, the plug may be inserted through the opening in the foremost trailer frame bar thereby opening the safety control switch to release the brake.

I claim as my invention:

1. In a combined vehicle comprising a tractor, a trailer and a coupling mechanism providing a draft connection between said tractor and trailer, the combination of a brake for said trailer, electromagnetic means controlling the setting of said brake, a battery on said trailer, a switch on said trailer controlling a circuit through said battery and said electromagnetic means and having a pair of contacts yieldably urged toward each other, an insulating member normally separating said contacts and mechanically connected to said tractor so as to be withdrawn from between said contacts upon separation of the tractor and trailer.

2. In a combined vehicle comprising a tractor, a trailer, and a coupling mechanism providing a draft connection between said tractor and trailer, the combination of a brake for said trailer, electromagnetic means controlling the setting of said brake, a battery on said trailer, a casing on said trailer and providing a forwardly facing opening, a switch disposed within said casing and comprising a pair of contacts normally urged toward each other and adapted when engaged to close a circuit through said electromagnetic means and said battery, an insulating plug adapted to be inserted into said casing through said opening to separate said contacts, and a flexible element attached at one end to said plug and at the other end to said tractor, said element being of sufficient length to hang slack when the tractor and trailer are in coupled relation but adapted to be placed under tension when the tractor is separated from the trailer whereby to withdraw said plug automatically and allow said switch to close.

In testimony whereof, I have hereunto affixed my signature.

JOHN WHYTE.